G. W. GARWOOD.
SELF LOCKING VALVE LIFTER FOR AUTOMOBILE ENGINES.
APPLICATION FILED JULY 19, 1915.
1,188,357.                                Patented June 20, 1916.
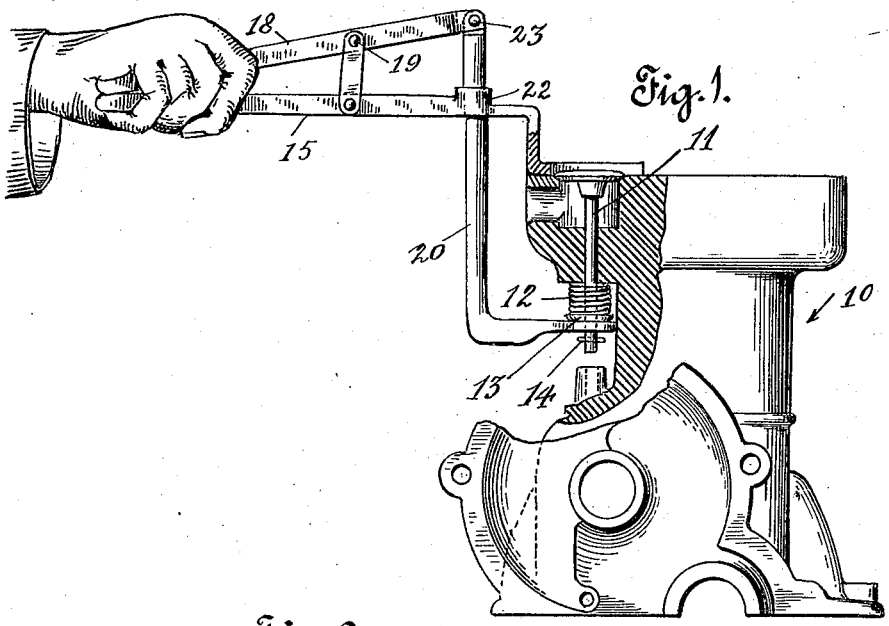
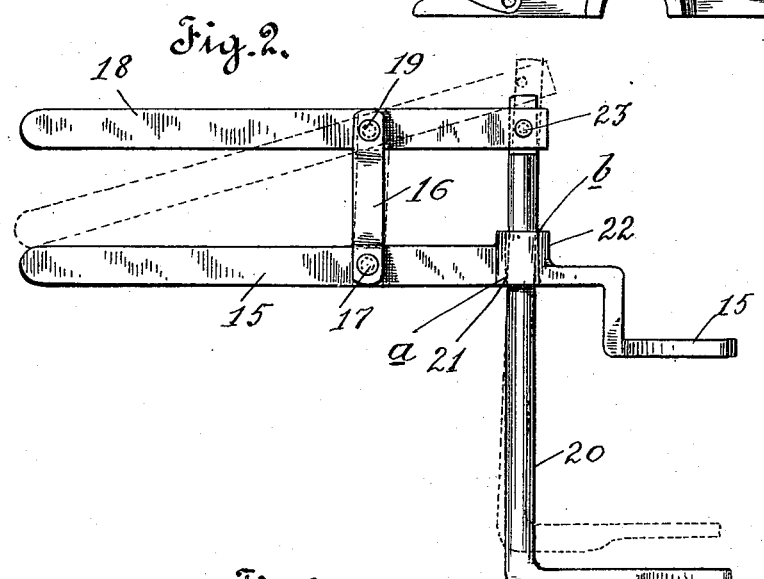
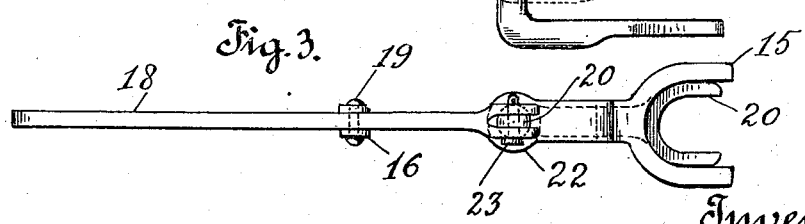
Witness,
J. E. Monteverde
Inventor,
George Wendall Garwood,
by Hazard Berry and Miller
Attorneys.

UNITED STATES PATENT OFFICE.

GEORGE WENDALL GARWOOD, OF EL MONTE, CALIFORNIA.

SELF-LOCKING VALVE-LIFTER FOR AUTOMOBILE-ENGINES.

1,188,357.  Specification of Letters Patent. Patented June 20, 1916.

Application filed July 19, 1915. Serial No. 40,574.

*To all whom it may concern:*

Be it known that I, GEORGE WENDALL GARWOOD, a citizen of the United States, residing at El Monte, in the county of Los Angeles and State of California, have invented new and useful Improvements in Self-Locking Valve-Lifters for Automobile-Engines, of which the following is a specification.

My invention relates to a self locking valve lifter for automobile engines.

As well known the valves of the internal combustion engine of an automobile need regrinding from time to time. In order to remove the valves for this purpose the cylinder head of the engine is removed and a valve lifting tool engaging the valve spring seat of the valve is applied lifting the seat against the tension of the spring. The valve seat pin is now pulled out and the valve itself is removed by the head preparatory to grinding.

In the valve lifting tools hitherto in use it is necessary to keep one hand on the tool in order to maintain the valve spring in its compressed position while the valve seat pin is removed.

It is an object of this invention to devise a valve lifting tool simple of construction, which after raising the valve spring will become locked, and which will maintain the valve spring in its compressed condition allowing both hands of the operator to be employed in removing the valve seat pin, and the valve itself, and which can be instantly released or unlocked.

My invention consists of the construction and arrangement of parts hereinafter described and claimed.

In the accompanying drawings, which form a part of this specification, I have illustrated a practical and convenient embodiment of my invention, and in which, Figure 1, shows an end view of an automobile engine with its cylinder head removed showing the application of the self locking valve lifter to a valve to be removed. Fig. 2, shows a side elevation of the device. Fig. 3, shows a top plan view.

10 designates an automobile engine with the cylinder head removed.

11 is a valve held normally against its seat by coiled spring 12, the lower part of which engages the valve spring seat 13 normally engaging valve seat pin 14.

The self locking valve lifter applied to said valve consists of the horizontal bar 15, which at its forward end projects downwardly, and again horizontally, the extreme forward end thereof being forked and semi-circular in shape. The object of making the forward end forked is to allow the same to straddle the head of the valve which is to be removed. Approximately mid-way between the ends of bar 15 an upwardly extending vertical link 16 is pivoted. This link is forked at both ends, the lower end being secured by a pin 17 extending transversely through bar 15, and through the forked ends of said link. A lever 18 extending in horizontal and parallel relation to bar 15 is pivoted to the vertical link 16 and a pin 19 passing transversely through said lever, and through the upper forked end of link 16. At the forward end of the lever a valve seat engaging member 20 is pivoted and extends downwardly therefrom passing through a bore 21 in bar 15. This bore is substantially mid-way between the forward end of bar 15 and pin 17. The shape of the valve seat engaging member and bore 21 is preferably cylindrical. In order to increase the bearing surface of bore 21 in which said member is slidably mounted, a boss 22 extends for a slight distance from bar 15. The upper end of said member is secured to lever 18 by a pin 23 securing the forked end of the lever to the upper end of said member. The lower end of said member extends at right angles in a horizontal direction forwardly thereof, and is provided with a forked end adapted to engage the circular spring seat of the valve.

From the foregoing description the operation of my improved valve lifter will be easily understood. In Fig. 1, the same is shown as applied to valve 11. The end of the horizontal bar 15 is placed on the top of the engine, the cylinder head having been removed, as shown in Fig. 1, in such a position that the head of valve 11 will be situated within the forked end thereof and spaced therefrom so that the valve may be lifted out without interference therewith. The forked end of valve lifting member 20 is inserted between the valve seat 13 and valve seat pin 14. Pressing on the outer end of lever 18 downwardly will raise the valve lifting member pivoted to the forward end thereof. The strain on the forward end of the valve lifting member exerted thereon by the valve spring 12 will cause the same to be moved outwardly to a slight degree as shown by the dotted lines in Fig. 2. The lower end of said member is moved outwardly, the upper end above the bore 22 will move inwardly causing that portion of the member situated within bore 22 to bind or lock, the locking action taking place between the valve lifting member within the bore and the lower and outer wall at the point $a$ and at point $b$ diametrically opposite from point $a$ at the upper and forward end of the bore 21 whereby the valve lifting member 20 will be held stationary or locked in its valve lifting position. Both hands of the operator are now free to remove valve seat pin 14 and to lift valve 11 from its seat. The link 16 is pivoted at both ends in order to allow the upper end of link 16 to move slightly forward, rocking on pin 17. Bar 15 has a downward extension at its forward end in order to clear the intake and exhaust manifolds of the engine, (not shown.)

When it is desired to release or unlock the valve lifting device it is only necessary to hold bar 15 stationary and to strike the vertical valve lifting member a slight blow at a point below bore 22 in a direction toward the valve seat. This blow will move the upright portion of member 20 in a true vertical position and release the portion within bore 21 at places $a$ and $b$ where the same is bound and gripped. The tension of spring 12 will move valve lifting member 20 downward whereby the device is unlocked and ready to be applied to another valve. It is not necessary that bore 22 and the valve lifting member form a tight joint. The device will operate even after long usage when said joint is worn and has a good deal of lost motion.

I claim:

1. In a self locking valve lifter for automobile engines, the combination of a horizontal bar provided with a forked end, and vertical link pivoted at its lower end to said bar at a point intermediate the ends thereof, said bar having a vertical bore between its forked end and said link, a lever fulcrumed to the upper end of said link at a point intermediate the ends of said lever, and a downwardly extending valve lifting member pivoted at its upper end to the forward end of said lever slidably mounted in said bore, the lower end of said member extending in a horizontal direction and being adapted to engage the spring seat of the engine valve.

2. In a self locking valve lifter for automobile engines, the combination of a horizontal bar having a front end adapted to engage the upper part of an automobile engine, a vertical link pivoted at its lower end to said bar at a point intermediate the ends thereof, said bar having a vertical bore between its forward end and said link, a lever fulcrumed to the upper end of said link at a point intermediate the ends of said lever, and a downwardly extending valve lifting member pivoted at its upper end to the forward end of said lever, said member being slidably mounted in said bore and adapted to engage with its forward end the spring seat of the engine valve.

3. In a self locking valve lifter for automobile engines, the combination of a horizontal bar adapted to engage the engine at a point above the valve spring seat, a lever extending in horizontal and parallel relation to said bar, a pivotal connection between said bar and said lever, said bar having a vertical bore between its forward end and said connection, a valve lifting member pivoted at its upper end to said lever and slidably mounted in said bore, the lower end of said member being adapted to engage the spring seat of the engine valve.

In testimony whereof I have signed my name to this specification.

GEORGE WENDALL GARWOOD.

Copies of this patent may be obtained for five cents each, by addressing the "Commissioner of Patents, Washington, D. C."